3,367,781
CULINARY MIXES CONTAINING ALKALI METAL ALKYL SULFATES
Robert R. Cooke, Evendale, Ohio, assignor to The Procter & Gamble Company, Cincinnati, Ohio, a corporation of Ohio
No Drawing. Filed Sept. 29, 1964, Ser. No. 400,249
21 Claims. (Cl. 99—94)

ABSTRACT OF THE DISCLOSURE

Crusts of white cakes prepared from dry white cake mixes containing shortening emulsifiers are strengthened by using an alkali metal $C_8$–$C_{18}$ alkyl sulfate in the mix.

---

This invention relates to prepared culinary mixes. More particularly, this invention relates to dry prepared white cake mixes containing sugar, farinaceous material, and shortening from which baking batters can be readily prepared by the addition of liquid ingredients.

So-called "dry" prepared mixes used for making are usually made by combining sugar, flour, shortening, and various other ingredients such as, for example, leavening, salt, milk solids, egg solids, flavoring and coloring, to form a free-flowing granular mixture. To prepare these dry mixes for baking, liquid materials such as water, milk or eggs are added, and the combination is beaten to form a homogeneous mixture and to incorporate air. The resulting batter is then baked to form a cake.

The various ingredients other than the usual sugar, flour, and shortening which are employed in dry prepared culinary mixes and their proportions are determined by the particular type of cake desired. For example, the ordinary yellow layer cake will usually contain whole eggs, including both the whites and yolks, whereas the standard white layer cake will contain the whites of eggs but not the yolks. On the other hand, chocolate and devil's food layer cakes will generally contain not only whole eggs but also a suitable amount of cocoa. At the other extreme, cakes of the foam batter type such as angelfood cakes, will contain egg whites but usually no egg yolks or shortening.

As used herein, the term "white cake mix" is meant to define a dry prepared culinary mix containing sugar, farinaceous material, and shortening which does not require the subsequent addition of egg yolk or egg yolk solids in the formation of a batter for the preparation of a white cake. In its preferred aspects, this term relates to white layer cakes of a conventional nature.

As is well known, the egg yolk employed in standard yellow cakes provides a yellowish color to the cake and serves as an emulsifying agent supplementing or replacing the normal emulsifying agents, for example, mono- and diglycerides, generally included in the shortening. Since white cakes do not contain egg yolk and, therefore, do not receive its beneficial emulsifying effect in the batter, such cakes must be otherwise formulated to insure that the liquid and solid ingredients of the batter are adequately emulsified.

Of the various types of emulsifiers used in shortenings and in dry, prepared cake mixes, the following three have been found to be particularly desirable for white cakes:

(1) Partial esters of propylene glycol and saturated fatty acid having from about 12 to about 22 carbon atoms.

(2) Partial esters of polyoxyethylene sorbitan and saturated fatty acid having from about 12 to about 22 carbon atoms, and (3) Esters of lactic acid and mono- and/or diglycerides containing saturated fatty acid groups having from about 12 to about 22 carbon atoms.

As used hereinafter, the term "white cake mix emulsifier" is meant to define one or more of the above three types of emulsifiers and mixtures thereof. These white cake mix emulsifiers have been found to be preferable to ordinary mono- and diglyceride emulsifiers or lecithin for conventional emulsification purposes in batters made from dry, prepared white cake mixes because of their superior emulsifying qualities. However, these white cake mix emulsifiers cannot be satisfactorily employed either alone or in combination in dry prepared white cake mixes because they tend to cause the white cake crusts to be weak and brittle. As a consequence, the white cakes prepared from mixes containing these emulsifiers split and break during ordinary handling operations such as depanning and icing. In order to utilize these white cake mix emulsifiers in dry prepared mixes, it is necessary to counteract these tendencies to weaken the crusts without at the same time detracting from the superior emulsifying properties of these agents.

Accordingly, it is a primary object of this invention to provide a method and composition for overcoming the tendency toward weakness and brittleness in crust structure of white cakes containing the above-defined white cake mix emulsifiers.

It is another object of this invention to provide a dry, prepared white cake mix which can be used in preparing white cakes having strong, flexible cake crusts which are highly resistant to splitting and breaking during ordinary handling.

Other objects and advantages will be apparent from the specification and appended claims.

In general, this invention comprises a dry, prepared white cake mix containing sugar, farinaceous material, shortening, and from about 0.05% to about 0.5%, by weight of the cake mix, of at least one edible water-soluble alkali metal alkyl sulfate, preferably sodium or potassium alkyl sulfate, said alkyl sulfate having from about 8 to about 18 carbon atoms, said shortening containing from about 2% to about 15%, by weight, of at least one emulsifier ester selected from the group consisting of partial esters of propylene glycol and saturated fatty acid, partial esters of polyoxyethylene sorbitan and saturated fatty acid, and esters of lactic acid with mono- and/or digylcerides of saturated fatty acid, said saturated fatty acids having from about 12 to about 22 carbon atoms.

White cake mixes coming within the scope of this invention must contain sugar, farinaceous material, shortening, and the above-specific amounts of white cake mix emulsifier and edible water-soluble alkali metal alkyl sulfate. A wide variety of white cakes can be prepared from dry, prepared mixes which contain these ingredients, but, for purposes of illustration, the following ranges of ingredients are set forth as representative of the proportions of ingredients which are preferably used in the practice of this invention:

| Ingredient: | Percent by weight |
|---|---|
| Sugar | 30 to 45 |
| Farinaceous material | 35 to 50 |
| Shortening [a] | 5 to 25 |
| Leavening agents | 1 to 5 |
| Alkali metal alkyl sulfate | 0.05 to 0.5 |
| Non-fat dry milk solids | 0 to 5 |
| Flavoring | 0 to 2 |

[a] Including 2% to 15% white cake mix emulsifier (shortening weight basis).

In general, the types and qualities of the above-listed materials (with the exception of the white cake mix emulsifier in the shortening and the separately added alkali metal alkyl sulfate) are those which are used in prior art white cake mixes. For example, suitable sugars include any of the commonly used granular or powdered sugars such as sucrose, dextrose, maltose, fructose, lactose, invert sugars and mixtures thereof. Farinaceous material customarily used in white cake mixes is bleached cake flour, containing at least 50% wheat flour. A portion of the four can be replaced with starch, and general purpose flours can also be used. Suitable shortenings include animal, vegetable and marine fats and oils, hydrogenated or unhydrogenated, including refined, naturally-occurring fats and oils, fractions thereof or rearranged fats and oils, containing fatty acid groups having from about 12 to about 22 carbon atoms.

The white cake mix emulsifiers of this invention can be prepared according to any one of a number of methods well known to those skilled in the art. For example, polyhydric compounds such as propylene glycol, glycerol, and polyoxyethylene sorbitan can be reacted with suitable long chain saturated fatty acids having from about 12 to about 22 carbon atoms such as palmitic and stearic acids or commercial mixtures of such acids such as double and triple pressed stearic acid, in the presence of acid or alkaline catalysts, to form partial esters by conventional esterification methods. By analogous methods, these polyhydric compounds can be reacted with fats having the corresponding fatty acid groups of the above-mentioned fatty acids, in the presence of acid or alkaline catalysts, to form similar partial esters by conventional interesterification methods. In the case of the reaction between glycerol and fatty acid or fat, the reaction mixture can contain, additionally, lactic acid, or the resultant partial ester can be separately reacted with lactic acid.

Other suitable methods for preparation of the white cake mix emulsifiers for use in the dry, prepared white cake mixes of this invention are described in detail in patents as follows: partial esters of propylene glycol and saturated fatty acid can be prepared by direct esterification or interesterification methods described by Arrowsmith et al., U.S.P. 2,383,581, granted August 28, 1945; Allen et al., U.S.P. 2,478,354, granted August 9, 1949; Logan, U.S.P. 2,669,572, granted February 16, 1954; and Kuhrt, U.S.P. 2,634,278, granted April 7, 1953; partial esters of lactic acid with mono- and/or diglycerides of saturated fatty acid can be prepared by methods described by Little, U.S.P. 2,480,332, granted August 30, 1949, Barsky, U.S.P. 2,509414, granted May 5, 1950 and Iveson et al., U.S.P. 2,690,971, granted October 5, 1954; and partial esters of polyoxyethylene sorbitan and saturated fatty acid can be prepared by methods described by Griffin, U.S.P. 2,380,166, granted July 10, 1945.

The water-soluble alkali metal alkyl sulfates of this invention can be prepared by any known process and most readily by sulfation of suitable saturated fatty alcohols having from about 8 to about 18 carbon atoms such as lauryl and myristyl alcohols or technical mixtures of such alcohols such as coconut oil-derived fatty alcohols, followed by neutralization with sodium carbonate, caustic soda, potash, or other suitable alkaline substances. Since these alkali metal alkyl sulfates are incorporated in the dry, prepared white cake mix as a separate ingredient apart from the shortening, it is essential that they be water-soluble as distinguished from oil-soluble substances such as dodecyl glyceryl ether sulfate.

Although particular methods of preparing the white cake mix emulsifiers and alkali metal alkyl sulfates are described herein, it is to be understood that invention does not reside in the preparation of these compounds or their separate use in baked goods in general, but in the herein-described use of these compounds in combination with each other in a dry, prepared white cake mix.

Preferred white cake mix emulsifiers of this invention are propylene glycol monostearate, polyoxyethylene (20) sorbitan monostearate, having an average of 20 oxyethylene units per molecule (e.g., "Tween 60"), and lactostearin. A preferred alkali metal alkyl sulfate is sodium lauryl sulfate (e.g., "Maprofix 563").

The dry, prepared white cake mixes of this invention can also contain, for example, protein materials such as milk and egg solids, flavoring agents such as vanilla and common salt, and leavening agents such as baking soda mixed with conventional baking acids. However, it should be understood that these substances do not have to be employed in the dry mix of this invention. Frequently, it is desirable to add some of these materials fresh at the time of preparing the cake batter, for example, fresh milk and egg whites.

The following examples are specific embodiments of the dry, prepared white cake mixes and the method of improving dry, prepared white cake mixes as described and claimed herein and serve to illustrate the invention with greater particularity. All percentages are by weight unless otherwise specified.

EXAMPLE 1

A dry, prepared white cake mix was made by blending the following ingredients with an electric mixer:

| Ingredients: | Percent by weight |
|---|---|
| Sugar (sucrose) | 43.85 |
| Bleached cake flour | 42.00 |
| Shortening [a] | 9.00 |
| Non-fat dry milk solids | 2.00 |
| Salt (sodium chloride) | 0.75 |
| Soda (sodium bicarbonate) | 0.90 |
| Sodium aluminum phosphate | 0.90 |
| Vanilla flavoring | 0.40 |
| Sodium lauryl sulfate ("Maprofix 563") | 0.20 |
| | 100.00 |

[a] The shortening consisted, by weight, of a blend of 91% base stock comprising, by weight, about 95% directed rearranged lard (produced by the method described in Holman and Going, U.S.P. 2,875,066, granted Feb. 24, 1959) and 5% soybean oil, which was refined, bleached, deodorized, and hydrogenated to an iodine value of about 70; and 9% of an emulsifier blend comprising a mixture of about 55% propylene glycol monostearate and 45% propylene glycol distearate.

To 19 ozs. (538.64 grams) of the above dry mix was added 60 grams of fresh egg whites and 310 grams of water. The ingredients were mixed 2 minutes with an electric mixer at medium speed and the batter was baked in an 8-inch (20.32 centimeters) pan 30 minutes at 350° F. (176.67° C.). The resultant white cake had very good texture and eating qualities. It had a very good crust strength such that the cake did not split or break apart during depanning and icing. The crust was substantially stronger in this respect than the crust of a similar cake prepared in the same manner but without the addition of the sodium lauryl sulfate.

Similar good quality white cakes are obtained when sodium and potassium myristyl sulfates are substituted for the sodium lauryl sulfate in Example 1.

EXAMPLE 2

Example 1 was repeated in all respects except that the shortening consisted, by weight, of a blend of 87% base stock (as defined in Example 1); 10% of an emulsifier blend comprising a reaction mixture of lactic acid and mono- and diglycerides of substantially complete hydrogenated soybean oil, said reaction mixture containing, by weight, about 25% mono-lactyl di-fatty acid glyceride, about 35% mono-lactyl mono-fatty acid glyceride, and about 40% of a mixture of other reaction products as well as minor amounts of unreacted material; and 3% of a superglycerinated rapeseed oil containing, by weight, about 40% monoglyceride, 40% diglyceride, and 20% triglyceride as described in Bedenk, U.S. Patent 3,037,864, granted June 5, 1962. Similar good quality white cakes were obtained as in Example 1.

EXAMPLE 3

Example 1 was repeated in all respects except that the shortening consisted, by weight, of a blend of 96% base stock comprising, by weight, about 80% soybean oil and 20% cottonseed oil, which is refined, bleached, deodorized, and hydrogenated to an iodine value of about 70, and 4% of polyoxyethylene (20) sorbitan monostearate ("Tween 60"). Similar good quality white cakes were obtained as in Example 1.

EXAMPLE 4

Example 1 was repeated in all respects except that variations in the amounts of non-fat dry milk solids and sodium lauryl sulfate were made as shown below. The cakes were subjected to a "break test" about 10 minutes after baking in order to quantitatively determine the relative crust strength and resistance to breakage. This test consisted of depanning the cake and placing it on top of a 4-inch diameter "pedestal," using a centering device. The time required for the cake to split apart and fall from the cylindrical support was observed and recorded. The table below shows several comparative test results in terms of the time required to split apart and fall off the pedestal ("break time").

| Test No.[1] | Break Time | |
|---|---|---|
| | Control Samples Without Sodium Lauryl Sulfate, seconds | Invention Samples With Sodium Lauryl Sulfate |
| 1 | 4 | 5 minutes. |
| 2 | 3 | (a) 50 seconds. |
| | | (b) 13 minutes. |
| 3 | 28 | 10 minutes, 5 seconds. |
| 4 | 16 | No break up to 30 minutes. |
| 5 | 29 | (a) 19 minutes, 5 seconds. |
| | | (b) No break up to 30 minutes. |
| 6 | 18 | 3 minutes, 6 seconds. |

[1] Test numbers 1 and 2 used 0.15% and numbers 3 to 6 used 2.15% non-fat dry milk solids. In the invention samples, test numbers 1 and 2 used 0.5%, numbers 3 and 4 used 0.2%, and number 6 used 0.25% sodium lauryl sulfate.

The above test results provide an objective measurement of the white cake crust strength obtained by this invention in comparison with the subjective test results shown in Examples 1 to 3. As can be seen from this table, the invention samples consistently showed a substantially longer break time than the comparative control samples. This clearly demonstrates the substantial improvements in white cake crust strength obtained with the dry mixes of this invention.

Variations and modifications of the present invention can be made upon study of the foregoing disclosure by those skilled in the art. Such variations and modifications are intended to be within the spirit and scope of this invention as defined in the appended claims.

What is claimed is:

1. A dry, prepared white cake mix containing sugar, farinaceous material, shortening, and from about 0.05% to about 0.5%, by weight, of at least one edible, water-soluble alkali metal alkyl sulfate, said alkyl sulfate having from about 8 to about 18 carbon atoms, said shortening containing from about 2% to about 15%, by weight, of at least one emulsifier ester selected from the group consisting of partial esters of propylene glycol and saturated fatty acid, partial esters of polyoxyethylene sorbitan and saturated fatty acid, and esters of lactic acid with mono- and diglycerides of saturated fatty acid, said saturated fatty acids having from about 12 to about 22 carbon atoms.

2. A dry, prepared white cake mix according to claim 1 wherein the emulsifier ester is propylene glycol monostearate.

3. A dry, prepared white cake mix according to claim 1 wherein the emulsifier ester is polyoxyethylene (20) sorbitan monostearate.

4. A dry, prepared white cake mix according to claim 1 wherein the emulsifier ester is lactostearin.

5. A dry, prepared white cake mix according to claim 1 wherein the alkali metal alkyl sulfate is selected from the group consisting of sodium and potassium alkyl sulfates.

6. A dry, prepared white cake mix according to claim 1 wherein the alkali metal alkyl sulfate is sodium lauryl sulfate.

7. A dry, prepared white cake mix according to claim 6 containing, additionally, up to about 5%, by weight, of non-fat dry milk solids.

8. A dry, prepared white cake mix containing sugar, farinaceous material, shortening, and from about 0.05% to about 0.5%, by weight, of sodium lauryl sulfate, said shortening containing from about 2% to about 15%, by weight, of propylene glycol monostearate.

9. A dry, prepared white cake mix according to claim 8 containing, additionally, up to about 5%, by weight, of non-fat dry milk solids.

10. A dry, prepared white cake mix containing from about 30% to about 45% sugar, from about 35% to about 50% farinaceous material, from about 5% to about 25% shortening, and from about 0.05% to about 0.5%, by weight, of at least one edible, water-soluble alkali metal alkyl sulfate, said alkyl sulfate having from about 8 to about 18 carbon atoms, said shortening containing from about 2% to about 15%, by weight, of at least one emulsifier ester selected from the group consisting of partial esters of propylene glycol and saturated fatty acid, partial esters of polyoxyethylene sorbitan and saturated fatty acid, and esters of lactic acid with mono- and diglycerides of saturated fatty acid, said saturated fatty acids having from about 12 to about 22 carbon atoms.

11. A dry, prepared white cake mix according to claim 10 wherein the emulsifier ester is propylene glycol monostearate.

12. A dry, prepared white cake mix according to claim 10 wherein the emulsifier ester is polyoxyethylene (20) sorbitan monostearate.

13. A dry, prepared white cake mix according to claim 10 wherein the emulsifier ester is lactostearin.

14. A dry, prepared white cake mix according to claim 10 wherein the alkali metal alkyl sulfate is selected from the group consisting of sodium and potassium alkyl sulfates.

15. A dry, prepared white cake mix according to claim 10 wherein the alkali metal alkyl sulfate is sodium lauryl sulfate.

16. A dry, prepared white cake mix according to claim 15 containing, additionally, up to about 5%, by weight, of non-fat dry milk solids.

17. A dry, prepared white cake mix containing from about 30% to about 45% sugar, from about 35% to about 50% farinaceous material, from about 5% to about 25% shortening, and from about 0.05% to about 0.5%, by weight, of sodium lauryl sulfate, said shortening containing from about 2% to about 15%, by weight, of propylene glycol monostearate.

18. A dry, prepared white cake mix according to claim 17 containing, additionally, up to about 5%, by weight, of non-fat dry milk solids.

19. A dry, prepared white cake mix containing from about 30% to about 45% sugar, from about 35% to about 50% farinaceous material, about 9% shortening, about 2% non-fat dry milk solids, and about 0.2% sodium lauryl sulfate, said shortening containing, by weight, about 5% propylene glycol monostearate.

20. A method of improving a dry, prepared white cake mix containing sugar, farinaceous material, and shortening, said shortening containing from about 2% to about 15%, by weight, of at least one emulsifier ester selected from the group consisting of partial esters of propylene glycol and saturated fatty acid, partial esters of polyoxyethylene sorbitan and saturated fatty acid, and esters of lactic acid with mono- and diglycerides of saturated fatty acid, said saturated fatty acids having from about 12 to about 22 carbon atoms, comprising additionally employing in the dry white cake mix at least one edible, water-soluble alkali metal alkyl sulfate in an amount of from about 0.05% to about 0.5%, by weight, and sufficient to substantially reduce the normal cake crust weakness and brittleness otherwise obtained in the preparation of white cakes from the dry mix in the absence of said alkali metal alkyl sulfate, said alkyl sulfate having from about 8 to about 18 carbon atoms.

21. A method according to claim 20 in which the emulsifier ester is propylene glycol monostearate and the alkali metal alkyl sulfate is sodium lauryl sulfate.

References Cited

UNITED STATES PATENTS

| | | | |
|---|---|---|---|
| 2,183,516 | 12/1939 | Mink | 99—92 X |
| 3,011,896 | 12/1961 | Eber et al. | 99—92 X |
| 3,222,184 | 12/1965 | Weiss et al. | 99—94 |
| 3,244,534 | 4/1966 | Buddemeyer et al. | 99—91 |

RAYMOND N. JONES, *Primary Examiner.*